United States Patent
Wu et al.

(10) Patent No.: US 6,978,321 B2
(45) Date of Patent: Dec. 20, 2005

(54) FLOPPY DRIVE TRANSITIONAL SYSTEM

(75) Inventors: Chun-Hsien Wu, Kaohsiung (TW); Chen-Yo Yu, Taipei (TW)

(73) Assignee: Quanta Computer Inc., (TW)

( * ) Notice: Subject to any disclaimer, the term of this patent is extended or adjusted under 35 U.S.C. 154(b) by 498 days.

(21) Appl. No.: 10/252,432

(22) Filed: Sep. 24, 2002

(65) Prior Publication Data

US 2004/0057148 A1     Mar. 25, 2004

(51) Int. Cl.⁷ ............................................. G06F 3/00
(52) U.S. Cl. .................. 710/8; 710/9; 710/10; 710/11; 710/12; 710/13; 710/14
(58) Field of Search ............................ 710/8, 9, 10, 11, 710/12, 13, 14

(56) References Cited

U.S. PATENT DOCUMENTS

| | | | | |
|---|---|---|---|---|
| 6,044,423 | A | * | 3/2000 | Seo et al. .................... 710/302 |
| 6,279,049 | B1 | * | 8/2001 | Kang ........................... 710/15 |
| 6,421,237 | B1 | * | 7/2002 | Kim ........................... 361/686 |
| 6,545,953 | B1 | * | 4/2003 | Herbert ......................... 369/4 |
| 6,757,165 | B2 | * | 6/2004 | Fujiki et al. ................ 361/686 |
| 6,779,068 | B2 | * | 8/2004 | Kim ........................... 710/303 |

* cited by examiner

*Primary Examiner*—Tammara Peyton
*Assistant Examiner*—Justin Knapp

(57) ABSTRACT

A transitional system uses two switching circuits to receive the same selection signal generated by an OR gate. This selection signal switches the two switch circuits and thereby assigns the floppy disc controller to connect to the corresponding bay connectors in accordance with which bay connector is connected to the floppy disc drive. Such assignment ensures that the floppy disc controller connects to the floppy disc drive.

8 Claims, 4 Drawing Sheets

| Device | Boolean algebra Value | |
|---|---|---|
| Floppy Disc Drive | 0 | 0 |
| Non-Floppy Disc Drive | 0 | 1 |
| | 1 | 0 |

Fig. 5 A

| Selection Signal Boolean algebra value | Disc A |
|---|---|
| 0 | Left Bay Floppy Disc Drive |
| 1 | Right Bay Floppy Disc Drive |

Fig. 5 B

FLOPPY DRIVE TRANSITIONAL SYSTEM

FIELD OF THE INVENTION

The present invention relates in general to a switching apparatus for computer systems. In particular, the present invention provides a floppy drive transitional system that is capable of automatically assigning the floppy disc drive, no matter whether it is connected to the right bay connector or the left bay connector, to connect with the floppy disc controller and to be operated on the same channel, such as disc A.

BACKGROUND OF THE INVENTION

Computer users are placing a growing demand on their computers' storage capabilities. As operating systems and programs increase in complexity, power and size, as users store greater amounts of information, and as that information becomes more complex, space on the computer's hard disk drive is quickly used up. In order to gain more storage capacity, many users wish to add a second storage apparatus, such as a hard disk drive, a CD drive or a DVD drive, to their system.

Device Bay, which is receiving broad industry acceptance, defines an industry specification for interchangeable peripheral devices, such as hard disk drives, modems, network adapters, CD drives, DVD drives and a variety of other electronics devices. Any peripheral can be plugged into the Device Bay without users having to open the PC box or switch it off. It allows devices to be daisy-chained and software takes care of which interface is used by the device. With Device Bay, a user is able to install a peripheral like a DVD drive directly in a PC without opening, rebooting or turning off the PC.

Since a conventional notebook computer as shown in FIG. 1 has a minimized main body, there is no room for a CD drive after installing the hard disc and floppy disc drive. Thus, only the floppy disc drive 10 (typically of 3.5 inch size) in the left bay and the hard disc 20 in the right bay are installed within a computer main body 100 as the auxiliary memory devices. If a user wishes to install a CD drive in this notebook computer, either the floppy disc drive 10 or the hard disc 20 must be replaced.

However, the foregoing configuration often incurs a problem. If the floppy disc controller in the computer system has indicated the floppy disc drive, such as disk A, inserted in the left bay as the first channel, such assignment requires that the floppy disc drive plug into the left bay. In other words, if a hard disc is plugged into the left bay and a floppy disc drive is plugged into the right bay, the floppy disc controller in the computer system will be confused when accessing data. Therefore, a non-floppy drive device can only be installed in the right bay of this notebook computer. Therefore, such a requirement limits the easy upgrade of hardware configurations and customization of PCs and peripherals.

SUMMARY OF THE INVENTION

It is therefore an object of the present invention to provide a floppy drive transitional system having a switch circuit to automatically assign the floppy disc drive as the first channel, disc A, whether plugged in the left bay or right bay. In accordance with the present invention, normal performance of this forgoing notebook computer is ensured even when a floppy disk drive is inserted into the right bay.

The present invention achieves the above-identified objects by providing a floppy drive transitional system having a switch circuit for indicating the floppy disc drive that is connected with the right bay connector or the left bay connector as the first channel, disc A. This assignment ensures that the floppy disc controller in the computer system always accesses the data from the floppy disc drive on the same channel, disc A. On the other hand, no matter whether the floppy disc drive is plugged into the left bay or the right bay, this floppy drive transitional system of the present invention connects the floppy disc drive with the floppy disc controller in the computer system.

In accordance with the present invention, the transitional system uses two switching circuits to receive the same selection signal generated by an OR gate. This selection signal switches the two switch circuits and thereby assigns the floppy disc controller to connect with the corresponding bay connectors in accordance with which bay connector the floppy disc drive is connected to. Such assignment ensures that the floppy disc controller connects with the floppy disc drive.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5A shows the setting of the Boolean algebra value of the bay devices in the present invention; and FIG. 5B shows the setting of the Boolean algebra value of the bay devices status in the present invention.

DETAILED DESCRIPTION OF THE PREFERRED EMBODIMENT

Without limiting the spirit and scope of the present invention, the floppy drive transitional system applied in a computer system for automatically indicating the floppy disc drive as the fixed channel, such as the disc A, no matter whether connected with the right bay connector or the left bay connector in the present invention is illustrated with one preferred embodiment.

Figure 1:
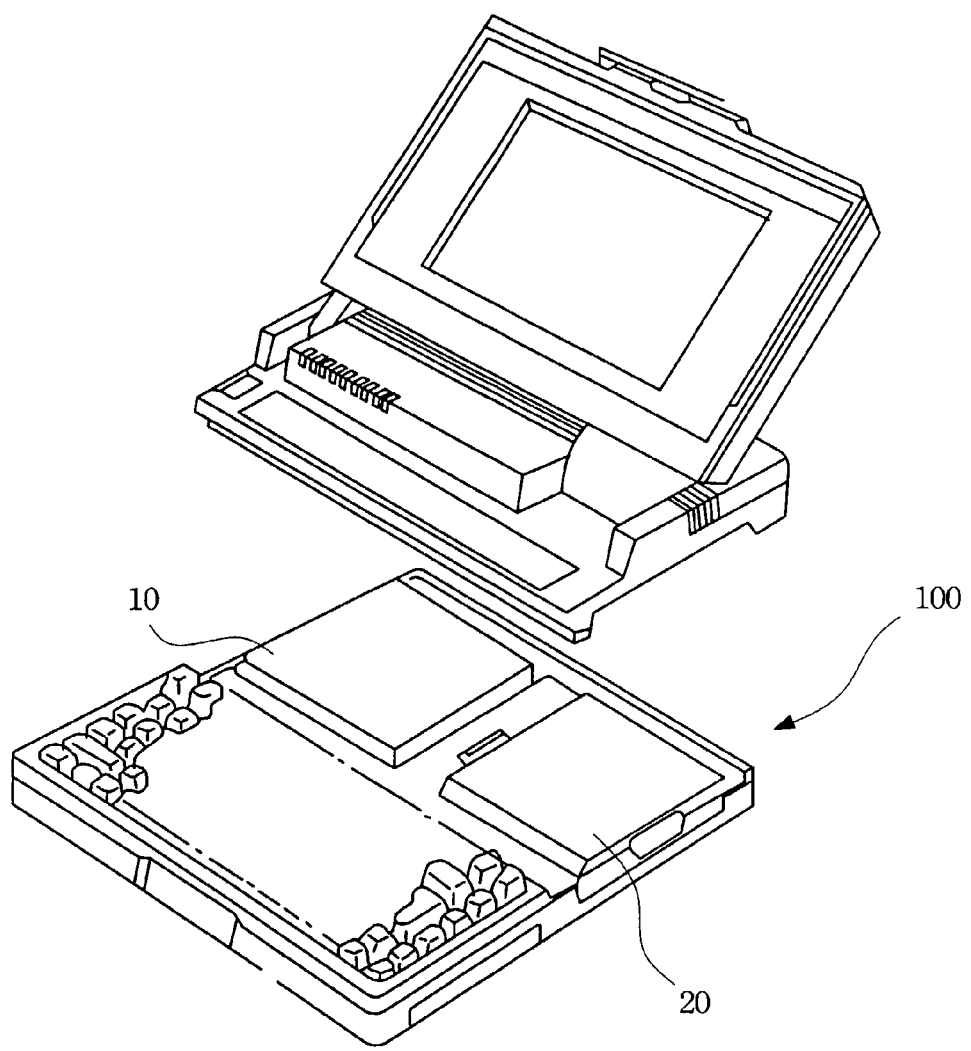
FIG. 1 shows a diagram of a conventional notebook.
Figure 2:
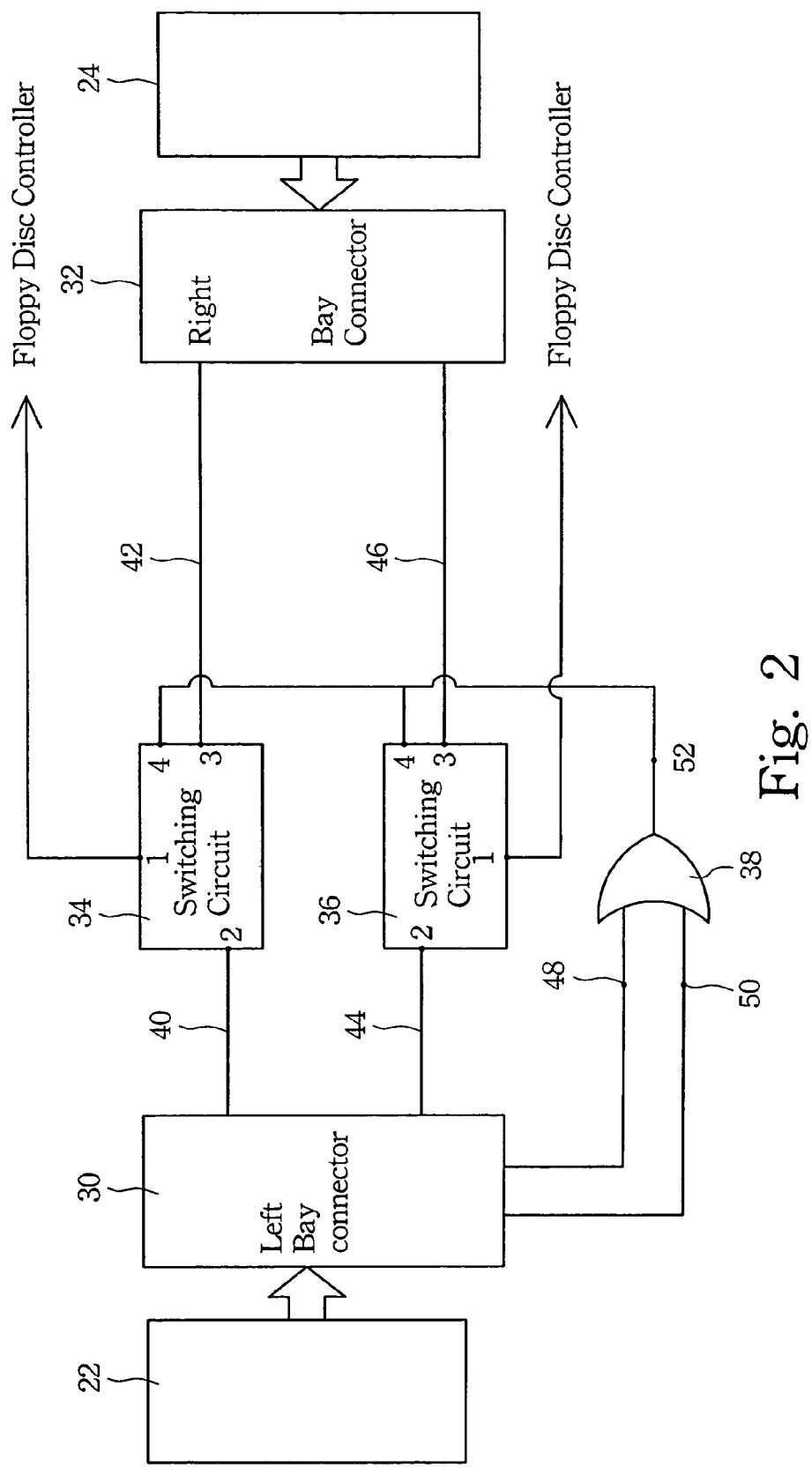
FIG. 2 shows a block diagram of the floppy drive transitional system according to the preferred embodiment of the present invention.

The present invention satisfies the above-stated needs by providing a floppy drive transitional system. FIG. 2 shows a block diagram of the floppy drive transitional system according to the present invention. In FIG. 2, two bay devices 22 and 24, a left bay device and a right bay device, are respectively connected to the right-bay connector 32 and the left-bay connector 30. The left bay device and the right bay device can be respectively a CD drive, a DVD drive, a hard disc drive or a floppy disc drive. In accordance with the hot plugging technology of the device bay, components can be plugged into the left bay device and the right bay device without users having to open or switch off the PC system.

Therefore, if the original setting of this computer system designates that the floppy disc drive inserted in the left bay connector 30 is operated on the first channel, such as the disc A, this computer system is in an abnormal situation when a non-floppy drive device is connected to the left bay connector 30. The present invention provides a floppy drive transitional system to solve this problem.

Reference is again made to FIG. 2. The floppy drive transitional system automatically assigns the floppy disc drive, no matter what is connected to the right bay connector or the left bay connector, to operate on the same channel, disc A. In accordance with a preferred embodiment of the present invention, this system comprises a left bay connector 30 for connecting with a bay device 22, a right bay connector 32 for connecting with another bay device 24, first and second switching circuit 34 and 36 both of them inserted between the right bay connector 32 and the left bay connector 30 and an OR gate 38 for generating a selection signal to the first and second switching circuit 34 and 36. The bay device can be a CD drive, a DVD drive, a hard disc drive, a floppy disc drive, or the like. The first and second switching circuit 34 and 36 comprise one function to switch automatically the floppy disc drive to connect with the floppy disc controller in the computer system.

As seen in FIG. 2, the first and second switching circuits 34 and 36 respectively have four connection points 1 to 4. Connection point 1 is connected to the floppy disc controller. Control of the floppy disc drive is carried out by a host device.

Connection point 4 of the two switching circuits 34 and 36 receives a selection signal from the output point 52 of the OR gate 38. The main function of the selection signal is to assign the floppy disc drive either inserted into the right bay or left bay connector to connect to the floppy disc controller in the computer system. Another function of the selection signal is to assign the floppy disc drive, of which one is the disc A, if the two bay connectors 30 and 32 both connect to floppy disc drives respectively. There are two input points 48 and 50 in the OR gate 38 for receiving the Boolean algebra value defined by the bay device inserted into the left bay connector 30. In accordance with the preferred embodiment of the present invention, when a bay device is plugged into the left bay connector 30, the set Boolean algebra value of the bay device is sent to the two input points 48 and 50 of the OR gate 38. The Boolean algebra value is (0,0) if the inserted bay device is a floppy disc drive. The Boolean algebra value is (0,1) or (1,0) if the inserted bay device is not a floppy disc drive. In other words, the received Boolean algebra value is determined by the bay device plugged into the left bay connector 30.

The connection points 2 and 3 of the second switching circuit 36 are respectively connected to the left bay connector 30 and the right bay connector 32 by the interface lines 44 and 46 to receive or transmit the floppy disc drive's motor signal.

In accordance with the preferred embodiment of the present invention, if a floppy disc drive is inserted into the left bay connector 30, the defined Boolean algebra value (0,0) is sent to the input points 48 and 50 of the OR gate 38. At the same time, a Boolean algebra value "0" is output from the OR gate 38 to the connection point 4 of the first and second switch circuits 34 and 36. In this situation, the floppy disc drive inserted into the left bay connector 30 is connected to the floppy disc controller and indicated as the disc A by through the interface lines 40 and 44.

On the other hand, if a floppy disc drive is inserted into the right bay connector 32 and a non-floppy drive device, such as a hard disc drive or a CD drive, is inserted into the left bay connector 30, in accordance with the defined Boolean algebra value of the non-floppy drive device, the value (0,1) or (1,0) is sent to the input points 48 and 50 of the OR gate 38. At the same time, a Boolean algebra value "1" is output from the OR gate 38 to the connection point 4 of the first and second switch circuits 34 and 36. In this situation, the floppy disc drive inserted into the right bay connector 32 is connected to the floppy disc controller and indicated as a disc A by through the interface lines 42 and 46.

Figure 3:
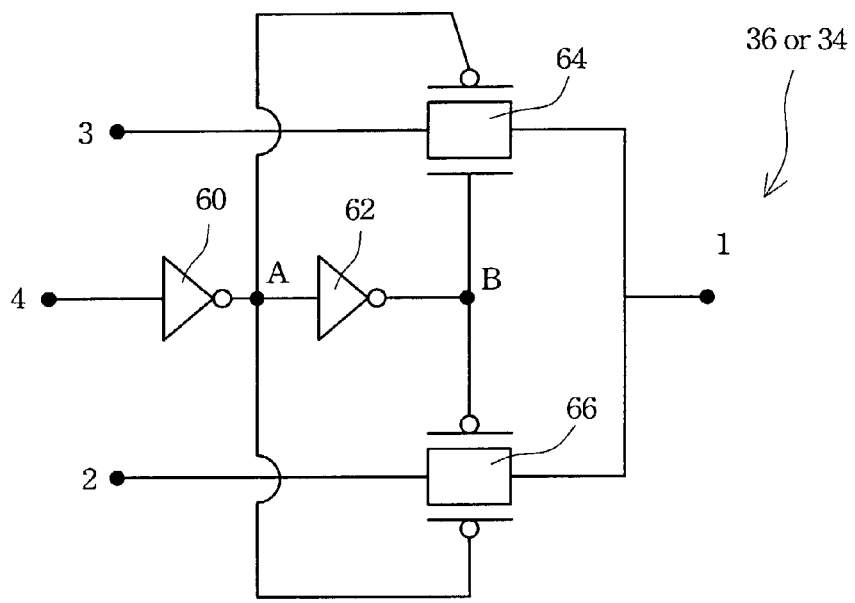
FIG. 3 shows a detail drawing of the switching circuit of the present invention.

An analog switch, such as NC7SB3157 produced by Fairchild Semiconductor Corporation, may be used as the switching circuit 34 and 36. Reference is made to FIG. 3, which shows a detailed drawing of the switching circuit 34 and 36 and numbers 1 to 4 representing the connection points. This switching circuit 34 and 36 comprise two inverters 60 and 62 and two transistor switches 64 and 66. When a bay device is plugged into the left bay connector 30, the set Boolean algebra value of the bay device is sent to the input points 48 and 50 of the OR gate 38 to generate a Boolean algebra value to the connection point 3 of the switching circuits 34 and 36. In accordance with the preferred embodiment of the present invention, the Boolean algebra value is (0,0) if the inserted bay device is a floppy disc drive. The Boolean algebra value is (0,1) or (1,0) if the inserted bay device is not a floppy disc drive.

If a floppy disc drive is inserted into the left bay connector 30, the Boolean algebra value (0,0) is respectively sent to the input points 48 and 50 of the OR gate 38. Then, a Boolean algebra value "0" is sent to the connection point 4 of the switching circuits 34 and 36. A Boolean algebra value "1" is generated at point A and a Boolean algebra value "0" is generated at point B when Boolean algebra value "0" passes through the inverters 60 and 62. The two different Boolean algebra values turn on the transistor switch 66 and turn off the transistor switch 64. At this time, the connection point 2 is connected to connection point 1 in the two switching circuits 34 and 36. As described in the above, connection point 1 is connected to the floppy disc controller. Therefore, the floppy disc drive inserted into the left bay connector 30 is connected to the floppy disc controller and is indicated as the disc A.

On the other hand, if a floppy disc drive is inserted into the right bay connector 32 and the non-floppy drive device, such as a hard disc drive, CD drive, or the like, is inserted into the left bay connector 30, the Boolean algebra value (1,0) or (0,1) is respectively sent to the input points 48 and 50 of the OR gate 38. Then, a Boolean algebra value "1" is sent to the connection point 4 of the switching circuits 34 and 36. A Boolean algebra value "0" is generated at point A and a Boolean algebra value "1" is generated at point B when Boolean algebra value "1" passes through the inverters 60 and 62. The two different Boolean algebra values turn on the transistor switch 64 and turn off the transistor switch 66. At this time, the connection point 3 is connected to the connection point 1 in the two switching circuits 34 and 36. As described above, the floppy disc drive inserted into the right bay connector 32 is connected with the floppy disc controller and is indicated as the disc A.

In accordance with the present invention, if the right bay connector 32 and the left bay connector 30 are respectively connected to floppy disc drives, the floppy disc drive inserted into the left bay connector 30 is indicated as the disc A. On the other hand, if the right bay connector 32 and the left bay connector 30 are respectively connected with non-floppy drive devices, this computer system still sets the non-floppy drive devices inserted into the right bay connector as the disc A but the floppy disc controller does not communicate with the non-floppy drive device.

Figure 4:
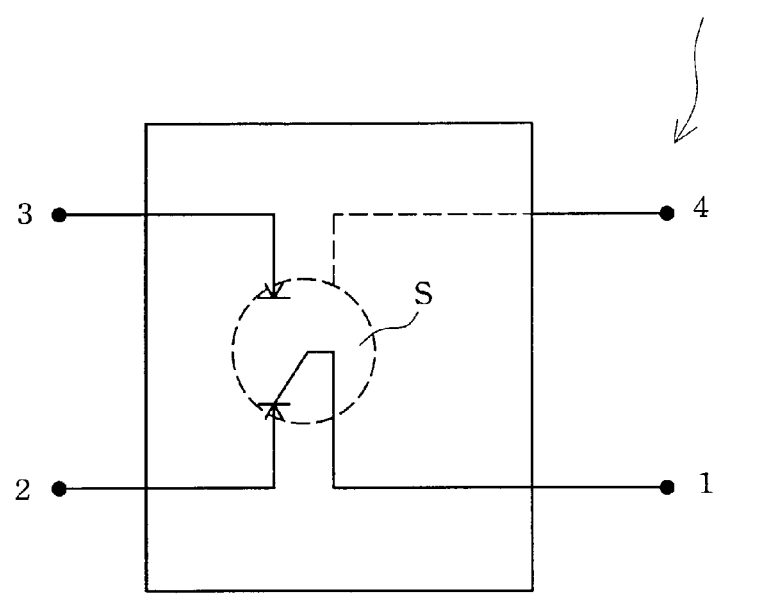
FIG. 4 shows a diagram of the switching circuits.

FIG. 4 shows a diagram of the switching circuit 36 or 34. The connection point 4 is used to receive the selection signal from the OR gate 38 to control the switch S to connect with the connection point 3 or 2. For example, if switch S is switched to the connection point 2, the connection point 2 is connected to connection point 1. On the other hand, if switch S is switched to connection point 3, connection point 3 is connected to connection point 1. Determination of whether the right bay device or the left bay device is controlled by the floppy disc controller and which one is disc A is made by the switch S assigning connection points 3 and 2, of which one is connected to connection point 1.

In accordance with the embodiment of the present invention, reference is made to FIG. 5A, which shows the setting of the Boolean algebra value in the present invention. In accordance with the present invention, the Boolean algebra value of the floppy disc drive is (0,0). The Boolean algebra value of the non-floppy drive device, for example, a hard disc drive, a CD drive, a DVD drive, or the like, is (0,1) or (1,0). FIG. 5B shows the setting status of the Disc A in accordance with the Boolean algebra value of the selection signal. In accordance with the embodiment, when the Boolean algebra value received by the connection point 4 is "0", the floppy disc drive inserted in the left bay connector is indicated as Disc A. When the Boolean algebra value received by the connection point 4 is "1", the floppy disc drive inserted in the right bay connector is indicated as Disc A.

As is understood by a person skilled in the art, the foregoing two preferred embodiments of the present invention are illustrative of the present invention rather than limiting of the present invention. They are intended to cover various modifications and similar arrangements included within the spirit and scope of the appended claims; for example, the logic circuit apparatus is not only the design as described in the above and other switching circuit designs having the same function also may be used in this present invention, the scope of which should be accorded the broadest interpretation so as to encompass all such modifications and similar structures.

What is claimed is:

1. A floppy drive transitional system for automatically assigning a floppy disc drive to connect with a floppy disc controller and to be operated in a same channel no matter whether the floppy disc drive is inserted in a right bay connector or a left bay connector, said system comprising:
   an OR gate having first and second input points for receiving a pair of Boolean algebra values from said left bay connector and outputting a first Boolean algebra value; and
   first and second switching circuits respectively having four connection points for respectively connecting to said floppy disc controller, said left bay connector, said right bay connector and receiving said first Boolean algebra value, wherein said two switching circuits may switch according to said first Boolean algebra value to make said connected left bay connector or right bay connector connect to said connected floppy disc controller.

2. The floppy drive transitional system according to claim 1, wherein said first and second switching circuits switch said connected left bay connector to connect with said connected floppy disc controller when a floppy disc drive is inserted into said left bay connector.

3. The floppy drive transitional system according to claim 1, wherein said first and second switching circuits switch said connected right bay connector to connect with said connected floppy disc controller when a floppy disc drive is inserted into said right bay connector.

4. The floppy drive transitional system according to claim 1, wherein said pair of Boolean algebra values is related to a device plugged into said left bay connector.

5. The floppy drive transitional system according to claim 1, wherein said pair of Boolean algebra values is (0,0) when a device plugged into said left bay connector is a floppy disc drive.

6. The floppy drive transitional system according to claim 1, wherein said pair of Boolean algebra values is (1,0) or (0,1) when a device plugged into said left bay connector is a non-floppy drive device.

7. The floppy drive transitional system according to claim 1, wherein said connected left bay connector is connected to said connected floppy disc controller when the first Boolean algebra value received by said two switching circuits is "0".

8. The floppy drive transitional system according to claim 1, wherein said connected right bay connector is connected to said connected floppy disc controller when the first Boolean algebra value received by said two switching circuits is "1".

* * * * *